United States Patent [19]

Vareille et al.

[11] Patent Number: 5,343,049
[45] Date of Patent: Aug. 30, 1994

[54] OPTICAL METHOD FOR DETERMINING RELATIVE POSITIONS OF TWO PIECES AND DEVICE FOR ITS IMPLEMENTATION

[75] Inventors: Aimé Vareille, Echirolles; André Schiltz, Saint Ismier; Jean C. Hauuy, Crolles, all of France

[73] Assignee: France Telecom, Paris, France

[21] Appl. No.: 23,687

[22] Filed: Feb. 26, 1993

[30] Foreign Application Priority Data

Feb. 28, 1992 [FR] France ............... 92 02397

[51] Int. Cl.$^5$ .............................. G01N 21/86
[52] U.S. Cl. .................... 250/561; 356/387
[58] Field of Search ............ 250/560, 561; 356/386, 356/387

[56] References Cited

U.S. PATENT DOCUMENTS

| | | | |
|---|---|---|---|
| 3,193,689 | 7/1965 | Kerr | 250/560 |
| 3,765,774 | 10/1973 | Petrohilos | 250/560 |
| 4,182,259 | 1/1980 | Garner et al. | 118/712 |
| 4,297,585 | 10/1981 | Puschmann | 250/560 |
| 4,821,544 | 4/1989 | Tamler et al. | 72/16 |
| 5,239,183 | 8/1993 | Kound et al. | 250/561 |

FOREIGN PATENT DOCUMENTS

| | | |
|---|---|---|
| 011152 | 12/1986 | European Pat. Off. |
| 0250768 | 1/1988 | European Pat. Off. |
| 0400408 | 12/1990 | European Pat. Off. |
| 1548283 | 8/1969 | Fed. Rep. of Germany |

OTHER PUBLICATIONS

Hogenkamp et al., "Optoelectronic Sensor for Measuring the Shape of Two-Dimensional Objects," *Sensors and Actuators*, 17:259–266, 1989.

*Primary Examiner*—David C. Nelms
*Attorney, Agent, or Firm*—Arnold, White & Durkee

[57] ABSTRACT

Optical method for determining the lateral gap of two pieces (1, 2) having adjacent edges (3, 4) forming a slot (5) consisting in emitting a parallel light beam (8) through at least one zone of said slot, from one side of the latter; in detecting the beam (8a) passing through this zone of said slot, at the other side of the latter; and in comparing the light intensity of this beam transversing said zone with a predetermined value so as to obtain or to provide the gap between the edges of said pieces in said zone. This method may be applied to the positioning of a first piece, such as a chip, opposite or in an opening made in a second piece, such as a substrate, and may consist in moving said first piece in order to bring it above the opening of the second piece, in comparing, as the first piece moves, the light intensity passing through the slot separating said pieces and in stopping the movement of the first piece when the intensity of the light through-beam is equal to a predetermined value.

12 Claims, 2 Drawing Sheets

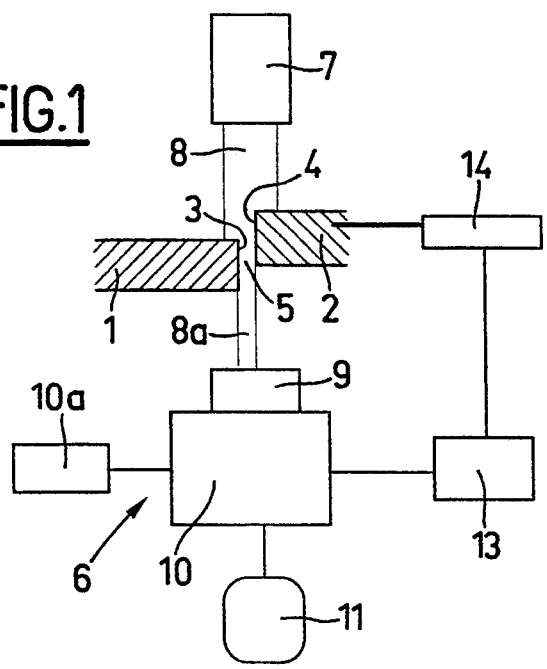
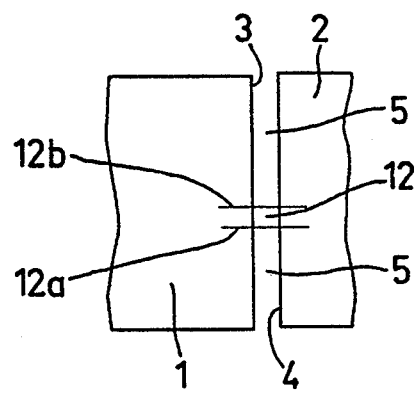
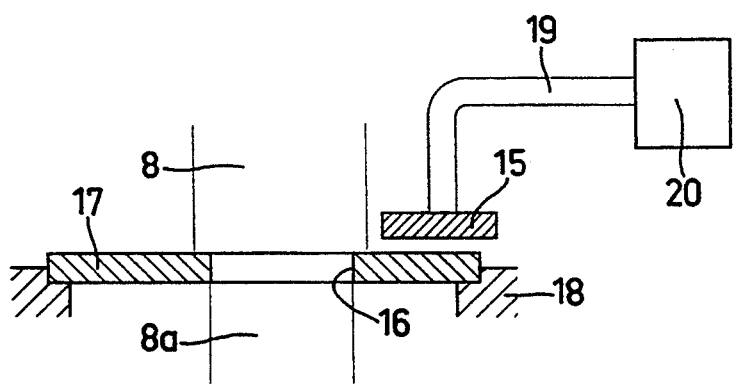
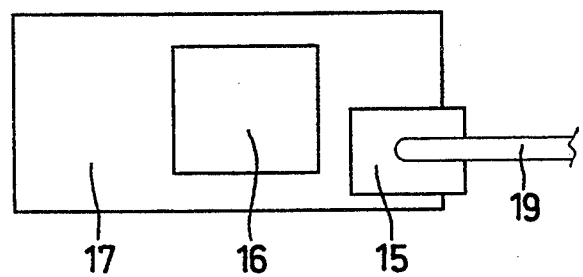

OPTICAL METHOD FOR DETERMINING RELATIVE POSITIONS OF TWO PIECES AND DEVICE FOR ITS IMPLEMENTATION

The present invention relates to an optical method for determining relative positions of two pieces and a device for the implementation of this method.

One of the techniques for producing hybrid circuits consist in inserting one or more chips into a through-hole produced in a substrate which carries an interconnection network to which the connection contacts of the chips are connected by bridges. However, this technique requires the edges of the chips to be arranged accurately with respect to the walls of the aforementioned hole.

The present invention provides a simple solution for determining the gap between two pieces with a view in particular to arranging them with respect to each other, which solution advantageously may be used for solving the aforementioned problem of positioning a chip in an opening of a substrate.

The present invention, according to a first subject, relates to an optical method for determining the lateral gap of two pieces having adjacent edges forming a slot.

According to the invention, this method consists in emitting a parallel light beam through at least one zone of said slot via one side of the latter, in detecting the beam passing through this zone of said slot via the other side of the latter and in comparing the light intensity of this beam passing through said zone to a predetermined value so as to obtain or to provide the gap between the edges of said pieces in said zone.

According to the invention, the method may advantageously consist in moving said pieces with respect to each other until the light intensity of the aforementioned through-beam is in a predetermined ratio with the aforementioned predetermined value.

According to the invention, the method may advantageously consist in comparing the light intensity of the beams passing through two zones of said slot and in moving said pieces with respect to each other such that the beam passing through these two zones is in a predetermined ratio.

The present invention, according to another subject, also relates to an optical method for positioning a first piece opposite or in an opening made in a second piece. According to the invention, this method consists in emitting a parallel light beam through said opening of the second piece and covering this opening, in detecting the beam passing through said opening, in moving said first piece in order to bring it above the opening of the second piece, in comparing, as the first piece moves, the light intensity passing through the slot separating said pieces and in stopping the movement of the first piece when the intensity of the light through-beam is equal to a predetermined value.

According to the invention, the method may advantageously consist in stopping the movement of the first piece when the intensity of the light through-beam reaches a minimum value.

In a variant, the method may consist, in a subsequent step, in engaging the first piece in the opening of the second piece.

According to the invention, the positioning of the first piece with respect to the second piece is preferably carried out by implementing the aforementioned method relating to the adjustment of the edges of two pieces.

The method preferably consists in selecting at least one zone, preferably two, in facing portions of the slot separating the first and second pieces.

According to the invention, the beam of parallel light is preferably emitted parallel to the axis of said opening.

In a preferred embodiment of the invention, the method consists in performing the aforementioned comparisons by counting pixels, the associated respective signals of which are greater than or less than a predetermined value, which signals arise from the image of the detected and digitized aforementioned through-beam, the comparisons being made as said pieces move successively with respect to each other.

In a particular application, the method according to the invention is suitable for inserting at least one chip into an opening made in a substrate.

The present invention also relates to a device for the implementation of the aforementioned method, which device comprises means for emitting a beam of parallel light, means for detecting the aforementioned through-beam, means for comparing the light-intensity signal of this through-beam with a predetermined value.

According to the invention, said means for detecting the through-beam preferably comprise a camera having means for digitizing the detected image and that said comparison means comprise pixel-selecting and pixel-counting means, the associated signal of which is greater than or less than a predetermined value.

The present invention will be easier to understand by studying an optical device for determining relative positions of pieces and the various modes of using it, which are described by way of non-limiting examples and illustrated by the drawing in which:

FIG. 1 shows diagrammatically an optical device for determining position, according to the invention, of two adjacent parts;

FIG. 2 shows a plan view of these pieces;

Figure 5:
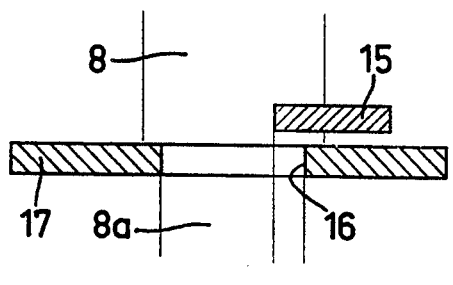

FIGS. 3, 4, 5, 6, 7, 8, 9 and 10 show the various steps with a view to inserting a chip into a substrate, implementing the aforementioned device of the invention, FIGS. 3, 5, 7 and 10 showing the pieces in vertical section and FIGS. 4, 6, 8 and 9 showing them in plan view.

Referring to FIGS. 1 and 2, it may be seen that two parallel flat pieces 1 and 2 have been shown which have adjacent edges 3 and 4 forming a slot 5 between them. In the example, the pieces 1 and 2 are slightly offset in the direction of their thickness and their edges 3 and 4 are parallel. However, the latter could be inclined with respect to each other.

The optical device for determining position, designated in a general manner by the reference 6, comprises a device 7 for emitting a parallel light beam 8, preferably of white light so as to avoid diffraction phenomena.

At some distance from the emission device 7 and in the parallel light beam 8 which it emits, the device comprises a camera 9 which has means for digitizing, point by point, the detected image, and comparison means 10 which, for example, are connected to a display screen 11.

The parts 1 and 2 are arranged perpendicularly to the parallel light beam 8 emitted by the emission device 7. The slot 5 is arranged in this beam 8, the width of which is greater than the width of this slot 5. It follows that a part of the emitted beam 8 passes through the slot 5 and the through-beam 8a is detected by the camera 9.

In a selected zone 12 of the slot 5, for example a zone delimited by two parallel lines 12a and 12b which are perpendicular to the slot 5 and spaced apart in the longitudinal direction of the latter, these lines 12a and 12b being fixed, for example, with the aid of a data-inputting member 10a, the comparison means 10 compares the intensity levels of the pixels to a predetermined value, thus making it possible to obtain 1 levels, or alternatively 0 levels, in the zone 12 of the slot 5 and 0 levels, or alternatively 1 levels, on either side of the edges 3 and 4 of the pieces 1 and 2 and on either side of the lines 12a and 12b.

As a consequence, a bright spot corresponding to the zone 12, surrounded by a dark zone, may be seen on the display screen 11. The light intensity of the through-beam 8a in the zone 12 may consequently be qualified or quantified by the number of pixels in the 1 state. Having previously stored in memory, with the aid of the data-inputting member 10a, the number of pixels which corresponds to a predetermined gap between the edges 3 and 4 of pieces 1 and 2, the actual gap between these edges may be calculated proportionally. This mode, in fact, enables the analysis of the intensity of the through-beam to be converted into an area analysis.

The device 10 may be linked to a movement-computing member 13 which makes it possible to calculate, as a function of the number of pixels corresponding to the actual gap separating the edges 3 and 4 of the pieces 1 and 2, a course to be followed in order for this gap to be equal to a fixed value, for example the predetermined value indicated hereinabove. This computing member may then provide an instruction to a member 14, for example, for moving the part 2 so that the latter moves this piece so that the gap between the edges 3 and 4 of the pieces 1 and 2 is brought to the fixed value, to which a width of the through-beam 8a corresponds. This movement member 14, of known structure, can enable the piece 2 to undergo a translation and/or a rotation.

If two zones 12 spaced apart along the slot 12 are selected, then it is possible to adjust the pieces 1 and 2 with respect to each other such that their edges 3 and 4 form a predetermined angle, the numbers of pixels associated with the two zones 12 having to be in a predetermined ratio for this.

Now referring to FIGS. 3 to 10, a description will now be given of the various operating phases with a view to inserting a chip 15 into a through-hole 16 of a board-shaped substrate 17, implementing the optical position-determining device 6 previously described with reference to FIGS. 1 and 2.

In the example, the chip 15 is rectangular and the through-hole 16 is also rectangular but slightly larger than the chip 15 such that the latter can be inserted inside, leaving a slight clearance all the way round.

As shown solely in FIG. 3, the substrate 17 is arranged horizontally on a support 18 such that the parallel light beam 8 emitted by the emission device 7, which is placed above the substrate 17 extends perpendicularly to this substrate and completely covers its opening 16, the camera 9 and being disposed beneath the substrate 17, and receiving completely the beam 8a passing through the opening 16 in its entirety.

The chip 15 is carried, from above, by virtue of a suction tube 19 mounted on a movement device 20, of a known type adapted for moving the chip 15 horizontally above the substrate 17, vertically and rotationally. This movement device 20 corresponds to the movement member 14 and is connected to the computing means 13.

As seen in FIGS. 3 and 4, the chip 15 which is, for example, picked up by the sucking member 19 at a standby unit, is advanced by virtue of the movement device 20 in order to arrive above the substrate 17. As long as the chip 15 does not enter the emitted parallel light beam 8, the camera sees the entire opening 16 with which is associated a predetermined number of pixels in the 1 state visible on the screen 11.

Figure 6:
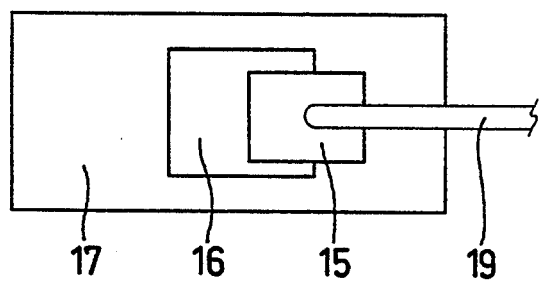

The movement device 20 moves the chip 15 in the direction of the opening 16 and it penetrates into the emitted parallel light beam 8, as shown in FIGS. 5 and 6. In so doing, the cross sectional area of the through-beam 8a is reduced and the number of pixels in the 1 state, which is associated with this area, decreases.

Figure 7:
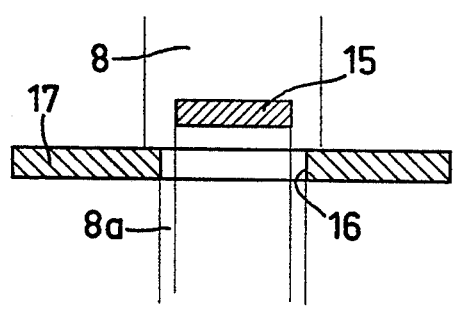
Figure 8:
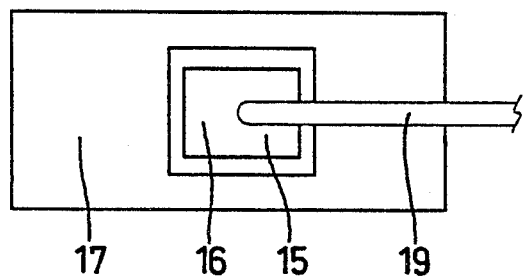

By continuing to move the chip 15 by virtue of the movement device 20 towards the opening 16, it arrives right opposite the latter, as shown in FIGS. 7 and 8. This desired position may be detected by the measurement device 6 since, in this position, the number of pixels in the 1 state reaches a minimum which corresponds to the cross sectional difference between the area of the opening 16 and the area of the chip 15.

The preceding positioning steps may advantageously be carried out automatically by virtue of the computing means 13 which can control the movement device 20, for example step by step, by comparing, at each step, the number of pixels in the 1 state to the number of pixels in the 1 state obtained during the previous step, and this continues until either the number of pixels in the 1 state becomes equal to a predetermined number of pixels, which is prefixed and stored in memory, corresponding to the aforementioned minimum, or quite simply when the number of pixels in the 1 state reaches a value which does not change and which corresponds to this aforementioned minimum. The beam 8a is then annular.

With the chip 15 opposite the opening 16 of the substrate 17, the next step is now to put it into a position such that the space between its periphery and the wall of the opening 16 is preferably constant all the way round.

In order to do this, the method described with reference to FIGS. 1 and 2 may advantageously be used.

Two zones 21 and 22 are selected along two adjacent edges of the chip 15 and of the opening 16 respectively, and a zone 23 is selected along the two opposite edges of the chip 15 and of the opening 16. These zones 21, 22 and 23 preferably have equal widths in the direction of the aforementioned edges.

Zones 24 and 25, preferably of the same width, are also selected along, the other two edges of the chip 15 and of the substrate 17 respectively.

By applying the automatism described previously with reference to FIGS. 1 and 2, the computing member 13 can then control the movement device 20 so as to bring the chip 15 into a position such that the distances between the four edges of the chip 15 and the four edges of the opening 16 are equal, the chip 15 then being centered.

Naturally, it is possible to perform this adjustment approximately by manually controlling, step by step, the movement device 20 and by observing the zones 21 to 25 on the screen 11.

Having centered the chip 15 opposite the opening 16, this chip 15 may then be engaged, by virtue of the movement device 20, by vertical downward movement, in the opening 16 of the substrate 17. Having performed this insertion, the gap between the peripheral wall of the chip 15 and the peripheral wall of the opening 16 may then be checked and its position possibly corrected in the same manner as previously by observing the zones 21 to 25.

In another way of proceeding, it would be possible to bring the chip above the opening 15, to engage it in this opening and then to position it with respect to the walls of this opening.

Figure 10:
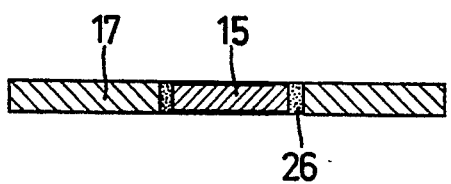
Figure 9:
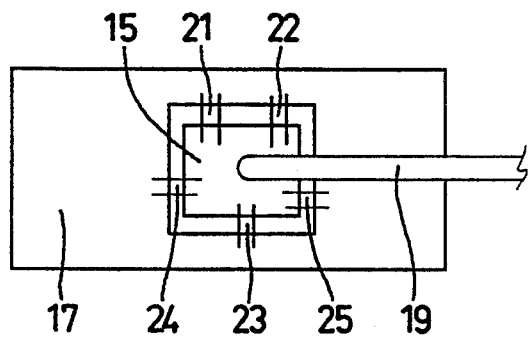

With the chip 15 correctly positioned in the opening 16 of the substrate 17, it may then be sealed by injecting, between its periphery and the wall of the opening 16, a sealing material 26, as shown in FIG. 10. Having carried out this sealing, the suction tube 19 is released, which lets go of the chip 15 and which can then be taken away by the movement device 20 so as to position and seal another chip in another opening of the substrate 17.

Moreover, it is conceivable to insert, into the same opening 16 of a substrate 17, a plurality of chips 15 which would be arranged in an adjacent manner, leaving a predetermined space so as to seal them. The operating mode described previously can be used for this purpose simply by matching the gaps in the aforementioned zones to the desired positions for each of the chips and by performing gap calculations possibly only on three sides of each of the chips.

The present invention is not limited to the examples described hereinabove. Many alternative embodiments are possible without departing from the scope defined by the attached claims.

We claim:

1. A device for positioning a first piece opposite or in an opening in second piece, comprising:
    (a) a light emitter for emitting a substantially parallel light beam during use,
    (b) a light beam intensity detector,
    (c) a zone selector for selecting a beam zone during use,
    (d) an intensity comparer for comparing intensity signals of the light beam passing through the zone during use, and
    (e) a mover adapted to move the two pieces with respect to each other, the mover being controlled in response to information obtained from the light beam intensity detector and/or intensity comparer during use.

2. The device of claim 1, wherein the light beam intensity detector comprises a camera adapted to digitize the detected image during use, and wherein the intensity comparer comprises pixel-selecting and pixel-counting during use.

3. The device of claim 1, wherein the device is applied to insert a chip into an opening in a substrate during use.

4. An optical method for positioning a first piece in an opening made in a second piece, comprising:
    (a) emitting a substantially parallel light beam, said light beam having an intensity, through the opening, such that the beam is substantially parallel to the axis of the opening,
    (b) detecting the light beam passing through the opening,
    (c) positioning the first piece by moving it in relation to the opening in the second piece, said movement being substantially perpendicular to the axis of said opening,
    (d) comparing with a predetermined value, during the positioning, the intensity of the light beam passing through the opening in the second piece,
    (e) halting the positioning when the intensity of the light passing through the opening in the second piece substantially reaches a minimum predetermined value,
    (f) engaging the first piece in the opening of the second piece, and
    (g) adjusting the position of the first piece with respect to the second piece by:
        (i) detecting beams that arise from said substantially parallel light beam and pass through at least two zones of a slot between an edge of the first piece and an edge of the opening of the second piece,
        (ii) comparing the light intensity of the beams passing through the at least two zones, and
        (iii) moving the first piece and second piece with respect to each other, substantially perpendicularly to the axis of the opening, until a ratio of the light intensities of the beams passing through said zones is substantially equal to a predetermined value.

5. The method of claim 4, wherein the step of adjusting the position of the first piece with respect to the second piece further comprises selecting zones in adjacent and facing portions of the slot separating the first and second pieces.

6. The method of claim 4, wherein the step of comparing the intensity of the light beam further comprises counting pixels to produce associated respective signals which are greater than or less than a predetermined value, which signals arise from the image of the beam passing through the opening, the beam being detected and digitized, and the comparisons being performed as the pieces move with respect to each other.

7. The method of claim 4, wherein the method is applied to insert a chip into an opening in a substrate.

8. An optical method for positioning a chip in an opening made in a substrate, comprising:
    (a) emitting a substantially parallel light beam, said light beam having an intensity, through the opening, such that the beam is substantially parallel to the axis of the opening,
    (b) detecting the light beam passing through the opening,
    (c) positioning the chip by moving it in relation to the opening in the substrate, said movement being substantially perpendicular to the axis of said opening,
    (d) comparing with a predetermined value, during the positioning, the intensity of the light beam passing through the opening in the substrate,
    (e) halting the positioning when the intensity of the light passing through the opening in the substrate substantially reaches a minimum predetermined value,
    (f) engaging the chip in the opening of the substrate, and
    (g) adjusting the position of the chip with respect to the substrate by:
        (i) detecting beams that arise from said substantially parallel light beam and pass through at least two zones of a slot between an edge of the chip and an edge of the opening of the substrate,
        (ii) comparing the light intensity of the beams passing through the at least two zones, and
        (iii) moving the chip and substrate with respect to each other, substantially perpendicularly to the axis of the opening, until a ratio of the light intensities of the beams passing through said zones is substantially equal to a predetermined value.

9. The method of claim 8, wherein the step of adjusting the position of the chip with respect to the substrate further comprises selecting zones in adjacent and facing portions of the slot separating the first and second pieces.

10. The method of claim 8, wherein the step of comparing the intensity of the light beam further comprises counting pixels to produce associated respective signals which are greater than or less than a predetermined value, which signals arise from the image of the beam passing through the opening, the beam being detected and digitized, and the comparisons being performed as the chip and substrate move with respect to each other.

11. A device for positioning a chip opposite or in an opening in a substrate, comprising:

(a) a light emitter for emitting a substantially parallel light beam during use,
(b) a light beam intensity detector,
(c) a zone selector for selecting a beam zone during use,
(d) an intensity comparer for comparing intensity signals of the light beam passing through the zone during use, and
(e) a mover adapted to move the chip and substrate with respect to each other, the mover being controlled in response to information obtained from the light beam intensity detector and/or intensity comparer during use.

12. The device of claim 11, wherein the light beam intensity detector comprises a camera adapted to digitize the detected image during use, and wherein the intensity comparer comprises pixel-selecting and pixel-counting during use.

* * * * *